A. A. TIRRILL.
CONSTANT CURRENT REGULATOR.
APPLICATION FILED DEC. 14, 1907.
1,098,649.
Patented June 2, 1914.
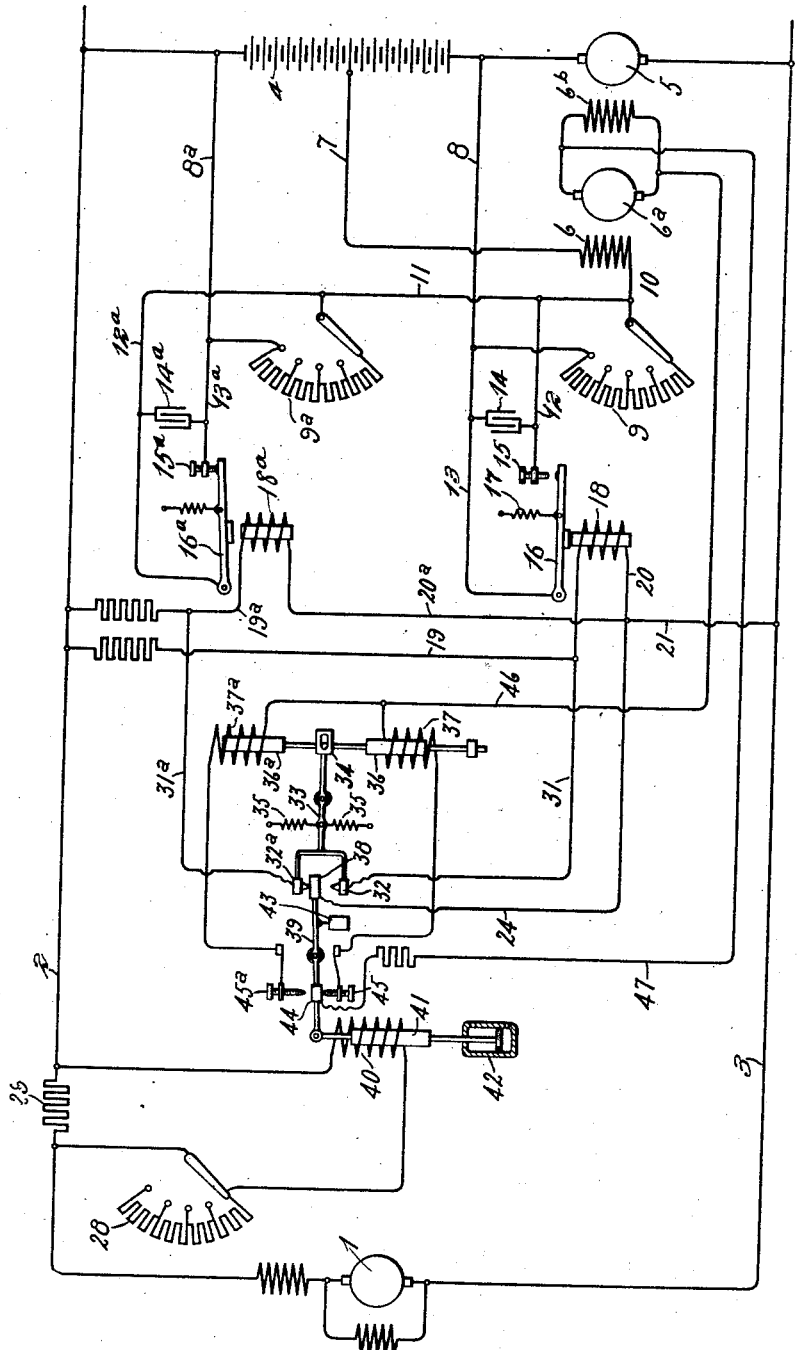
Witnesses:
George H. Tilden
J. Ellis Glen.
Inventor:
Allen A. Tirrill,
by Albert G. Davis
Att'y.

UNITED STATES PATENT OFFICE.

ALLEN A. TIRRILL, OF SCHENECTADY, NEW YORK, ASSIGNOR TO GENERAL ELECTRIC COMPANY, A CORPORATION OF NEW YORK.

CONSTANT-CURRENT REGULATOR.

1,098,649.  Specification of Letters Patent.  Patented June 2, 1914.

Application filed December 14, 1907. Serial No. 406,429.

*To all whom it may concern:*

Be it known that I, ALLEN A. TIRRILL, a citizen of the United States, residing at Schenectady, county of Schenectady, State of New York, have invented certain new and useful Improvements in Constant-Current Regulators, of which the following is a specification.

My invention relates to regulators for systems of electric distribution comprising dynamo electric machines, such as boosters, in which the voltage delivered by the machine is automatically varied in response to conditions on the system, and more particularly to regulators for systems in which a storage battery is used to equalize the load on the generator supplying the system, and the charging and discharging of the battery is regulated by a booster connected in series with it.

Boosters or similar machines have been regulated by varying both the direction and amount of current flowing through the field coil of the machine by means of two rheostats, one controlling the flow of current through the coil in one direction, and the other controlling the flow of current in the opposite direction. This arrangement is costly and inefficient, since each rheostat must be large enough to control the maximum amount of current through the coil, the regulation is sluggish and the current continually varies, since the rheostat cannot compensate quickly and accurately for slight changes in current.

The object of my invention is to provide a simple and efficient regulator, which controls both the direction and amount of magnetomotive force developed in the field of the booster or similar machine, which accurately and instantaneously varies the voltage of the machine by varying the length of time during which the field winding is energized, which avoids the necessity of constantly shifting a heavy rheostat arm, which when used with a booster in series with a storage battery will automatically throw the proper share of load on the battery and maintain a constant load on the generator, and which is in many particulars hereinafter pointed out an improvement on regulators for boosters or similar dynamo electric machines.

In carrying out my invention, a booster or similar machine is provided with means for producing a magnetomotive force in either direction in the field, and both the direction and duration of the magnetomotive force are under constant control of an automatic device instantly responsive to changes in load or other conditions on the circuit. In the preferred arrangement, a single field coil is arranged so that current may be sent through the coil in either direction. The duration of the flux set up in the field of the machine by the current in the field coil is varied by interrupting the flow of current, preferably by an automatic device responsive to load on the machine, which opens and closes either the circuit of the field coil or preferably a shunt circuit around a resistance in series with the field coil.

The automatic device is preferably what is known in the art as a Tirrill regulator and closes the circuit for energizing the field coil several hundred times per minute, automatically changing the length of the periods of time during which the circuit is closed and also changing the intervals between those periods so that conditions on the circuit may be varied from one extreme where the circuit is closed for comparatively long periods of time and opened only for an instant between periods, whereby nearly the same current flows as though the circuit were continuously closed, to the other extreme where the circuit is closed only for an instant and the intervals between the periods of closed circuit are so long that very little current flows. The rate at which the circuit is opened and closed may also be varied so that a very complete and accurate control of the circuit is secured. The device not only controls the amount of excitation of the field coil but also controls the direction of current through the field so that the voltage of the booster is varied both in direction and amount to control both the charging and discharging of the battery.

If the booster or similar dynamo electric machine is large, an exciter may be directly connected to the single field coil of the machine, and the exciter provided with a single field coil with two supply circuits for causing a current to flow in either direction, the duration of current in either direction being controlled by an automatic device responsive both to load on the circuit supplied by the machine and also to voltage on the exciter circuit, and arranged to open and close intermittently either supply circuit for the field coil of the exciter.

In the accompanying drawing, which shows one embodiment of my invention, the figure shows a regulator applied to a booster in series with a storage battery, the field of the booster being energized by means of an exciter.

In the arrangement shown, a generator 1 supplies current to a consumption circuit having leads 2 and 3, and the load on the generator is equalized by means of a storage battery 4 connected across the consumption circuit in parallel with the generator 1. In order to control the output of the storage battery and insure that it shall always take its share of the load and also to charge it without raising the voltage of the entire system, a booster 5, connected in series with the battery, is provided with regulating means for causing the booster to generate a voltage, which will either assist or oppose the discharge of the battery. As here shown the booster 5 is provided with a field coil $6^b$ directly connected in circuit with the armature $6^a$ of an exciter having a single field coil 6. Through this single field coil 6 current may flow in either direction from either of two supply circuits. One end of the field coil 6 is connected through a lead 7 to the middle of the battery 4, while the other end of the coil is connected to both ends of the battery, so that current flows in one direction from one end of the battery to the middle through one supply circuit comprising a lead 8 from one end of the battery, adjustable resistance 9, a lead 10, field coil 6 and lead 7 to the middle of the battery, and in the other direction from the middle of the battery to the other end through a second circuit comprising the lead 7, field coil 6, leads 10 and 11, adjustable resistance $9^a$ and a lead $8^a$ to the other end of the battery.

In order to control the duration and direction of the magnetomotive force generated in the field of the exciter and hence in the field of the booster, the flow of current through the field coil 6 from either supply circuit is intermittently interrupted in any suitable way, preferably by intermittently cutting resistance 9 or $9^a$ out of circuit as the case may be with the field coil by means of shunt circuits, one comprising leads 12 and 13 connected to opposite ends of the resistance 9 and the other comprising leads $12^a$ and $13^a$ connected to the opposite ends of the resistance $9^a$, both shunt circuits being opened and closed by any suitable automatic device, while condensers 14 and $14^a$ are preferably connected across the shunt circuits to diminish sparking at the contacts of the automatic device. The shunt circuit around resistance 9 is controlled by an automatic relay consisting of a fixed contact 15 connected to the lead 12 and coöperating with a movable armature and contact 16 connected to the other lead 13 and normally held in engagement with the fixed contact by a spring 17, while the shunt circuit around resistance $9^a$ has a corresponding fixed contact $15^a$ connected to a lead $13^a$ and coöperating with a movable armature and contact $16^a$ connected to the other lead $12^a$. The armatures are controlled by relay magnets 18 and $18^a$, the magnet 18 being connected in shunt across the consumption circuit through leads 19, 20 and 21 while the other relay magnet $18^a$ is also connected in shunt across the same circuit by means of leads $19^a$, $20^a$ and 21, both being in series with a suitable resistance. When either relay magnet is energized its armature moves against the tension of the restraining spring to open the shunt circuit around the corresponding regulating resistance, and thereby cuts the resistance into circuit with the field coil.

The relays controlling the two supply circuits for sending current through the coil 6 in opposite directions are in turn controlled by means of a regulator responsive to changes in load on the distribution system and to the voltage on the exciter circuit whereby the intensity and duration of the magnetomotive force generated by the booster is varied as the load upon the circuit and the voltage of the exciter may determine.

This device may assume various forms but the preferred arrangement is that shown in the drawings where the leads 19 and $19^a$ of the relay circuits are connected by means of leads 31 and $31^a$ to vibrating contacts 32 and $32^a$ mounted on a pivoted vibratory lever or armature 33 which is actuated through a pin and slot connection 34 at one end, being held in neutral position by opposing springs 35. The lever 33 is actuated through the connection 34 from oppositely disposed cores 36 and $36^a$ of exciter magnets or coils 37 and $37^a$ connected in shunt across and responsive to the voltage on the exciter circuit to vibrate the lever 33 and regulate the field coil 6 of the exciter by short circuiting one or the other of the relays 18 and $18^a$. If the relay 18 is deënergized the spring 17 will pull the armature 16 into engagement with the fixed contact 15, thereby short circuiting the resistance 9 and allowing maximum current to flow through the leads 8, 13, 12 and 10, the field coil 6 and lead 7 in one direction. At the same time the relay $18^a$ will remain energized and leave the resistance $9^a$ in circuit with the other supply circuit. If the relay $18^a$ is deënergized a reverse action will take place. In order that the exciter coils 37 and $37^a$ may control the relay magnets 18 and $18^a$ to produce the desired effect, a floating contact 38 mounted on a pivoted lever 39 and connected to the lead 21 through a lead 24 is situated between and coöperates with the vibratory contacts 32 and 32ª to control the circuits of the relays. The vibration of either contact 32 or 32ª into and out of engagement with the floating contact 38 short circuits the corresponding relay to produce the effect described.

The lever 39 is actuated by a current control magnet 40 connected through a variable resistance 28 to the ends of a shunt 29 in the consumption circuit and hence responsive to current from the generator, and has its core 41 so proportioned that it has a long range of movement in response to comparatively slight variations of current. The movement of the core 41 is steadied by a dash pot 42, and the weight of the core is partially counterbalanced by a counterweight 43 attached to the lever 39, so that a slight increase of current above its normal draws the core up into the coil, and a slight decrease permits it to sink down to the position shown in the drawing. The pivoted lever 39 controls the position of the floating contact 38 and also the circuit through the exciter magnets 37 and 37ª by means of a secondary floating contact 44 mounted on the lever and coöperating with yieldingly supported or flexible contacts 45 and 45ª connected through the exciter magnet coils 37 and 37ª and a lead 46 to one side of the exciter circuit, while the secondary floating contact 44 is connected through a lead 47 to the other side of the exciter circuit. When the core 41 moves downward in response to a decrease of load on the generator, the contacts 44 and 45 engage and keep the circuit through the coil 37 closed until the core returns to normal position, while an upward movement of the core due to increase in load keeps the circuit of the coil 37ª closed until the load on the generator is again normal.

In the operation of the system here shown the circuits through the relay magnets are controlled by a regulator responsive both to load on the consumption circuit and to the voltage on the exciter circuit. When the load on the system is normal the current control lever 39 may be in a neutral position out of engagement with any of the contacts, and under these conditions the voltages in the two supply circuits counteract each other and no current flows through the field coil 6 of the exciter. As the load begins to decrease, the generator attempts to supply less current and the current control magnet 40 permits the core 41 to sink to the position shown, closing the circuit through the exciter coil 37 and short circuiting the relay 18ª so that current flows through the field coil 6 and causes the exciter to generate a current which in turn causes the booster to develop a voltage in a direction to charge the battery. The voltage on the exciter circuit causes a current to flow through the exciter coil 37 and the pivoted lever 33 begins to vibrate in such a manner that the field coil 6 of the exciter is energized to the proper amount to cause the booster to charge the battery at a rate which maintains a constant load on the generator. The circuit through the exciter magnet 37 remains closed at the contacts 44 and 45 as long as the load is below normal, in spite of the fact that the floating contact 38 moves up and down in response to variation in the amount of the subnormal load and thereby alters the manner which the contacts 38 and 32ª engage, so that the number of times per second the circuit is closed and the duration of each closure depend not only upon the exciter coil 37 but also on the current controlled magnet 40.

If the load is normal and begins to increase, the attempt of the generator to furnish more current causes the core 41 to move upward, bringing the contact 44 against the contact 45ª, closing the circuit through the exciter coil 37ª and at the same time bringing the floating contact into engagement with the vibratory contact 32 to short circuit the relay magnet 18 and thereby send current through the field coil 6 in a direction to cause the booster to discharge the battery into the line. As long as the load is above normal the circuit through the exciter coil 37ª remains closed, and the current through the coil, varying with the voltage on the exciter circuit, causes the coil to vibrate the pivoted lever 33 so as to make and break the circuit around the relay magnet 18 in such a manner that the booster is caused to discharge the battery at a rate which makes it take its share of the load. During the time the load is changing the effect of the vibrations of the lever 33 is altered by the movement of the floating contact 38, which by moving toward the vibrating contact 32 as long as the load is increasing lengthens the periods during which the circuit is closed, and by moving in the opposite direction as long as the load is decreasing shortens those periods, so that the regulation of the booster is very quick and accurate.

My invention may be embodied in many other forms than that shown and described, and I therefore do not wish to be restricted to the exact form shown, but intend to cover by the appended claims all changes and modifications within the spirit and scope of my invention.

What I claim as new and desire to secure by Letters Patent of the United States, is,—

1. In a system of distribution, the combination with a storage battery and a booster in series therewith connected across a circuit, of an exciter for the booster, a relay coil for controlling the field of the exciter, floating contacts for short-circuiting said relay coil, an exciter coil connected across the exciter circuit for moving one of said contacts, means responsive to load on the system for moving the other of said contacts, and contacts actuated by said load responsive means to control the circuit through said exciter coil.

2. In a system of distribution, the combination with a storage battery and a booster in series therewith connected across a main circuit, of an exciter for the booster, relay coils for controlling the field of the exciter, a pair of vibratory contacts mounted on a vibratory support and connected to said relay coils, exciter coils connected across the exciter circuit for vibrating said support, a coöperating floating contact arranged to engage either of said vibratory contacts to short-circuit either relay coil, means responsive to load on the system for moving said coöperating contact, and coacting contacts controlled by said load responsive means for maintaining the circuit of one exciter coil closed when the load is above normal and the circuit of the other coil closed when below normal.

3. In a system of distribution, the combination with a booster connected to a consumption circuit, of an exciter for the booster, a pair of contacts for opening and closing a circuit to control the flow of current through the field of the booster, an exciter coil in shunt to the exciter circuit for controlling one of said contacts, a regulating coil in series with the consumption circuit for controlling the other contact, and coöperating contacts in the circuit of said exciter coil held in engagement by said regulating coil when the load is abnormal.

4. In a system of distribution, the combination with a dynamo electric machine connected to a consumption circuit, of an exciter for the field of said machine, supply circuits for sending current through the field of the exciter in either direction, vibrating contacts each included in one of said supply circuits, exciter coils connected in shunt to said exciter circuit for controlling said contacts, means coöperating with said exciter coils associated with each supply circuit for rendering the same effective, comprising a regulating coil in series with the consumption circuit, and contacts controlled by said regulating coil for closing the circuit of one exciter coil during underload and of the other exciter coil during overload.

5. In a system of distribution, the combination of a dynamo electric machine, a field winding therefor, an exciting circuit for said field including a pair of vibratory contacts and opposing coils for vibrating said contacts, a main control magnet responsive to the load on the system for engaging with either of said vibrating contacts, and a second pair of yieldingly supported contacts also engaging with the main control magnet for energizing one of said opposing coils while the other is deënergized.

In witness whereof, I have hereunto set my hand this 12th day of December, 1907.

ALLEN A. TIRRILL.

Witnesses:
BENJAMIN B. HULL,
HELEN ORFORD.